No. 641,516. Patented Jan. 16, 1900.
A. KAUFFMAN.
BICYCLE PROPULSION.
(Application filed Sept. 13, 1899.)
(No Model.)
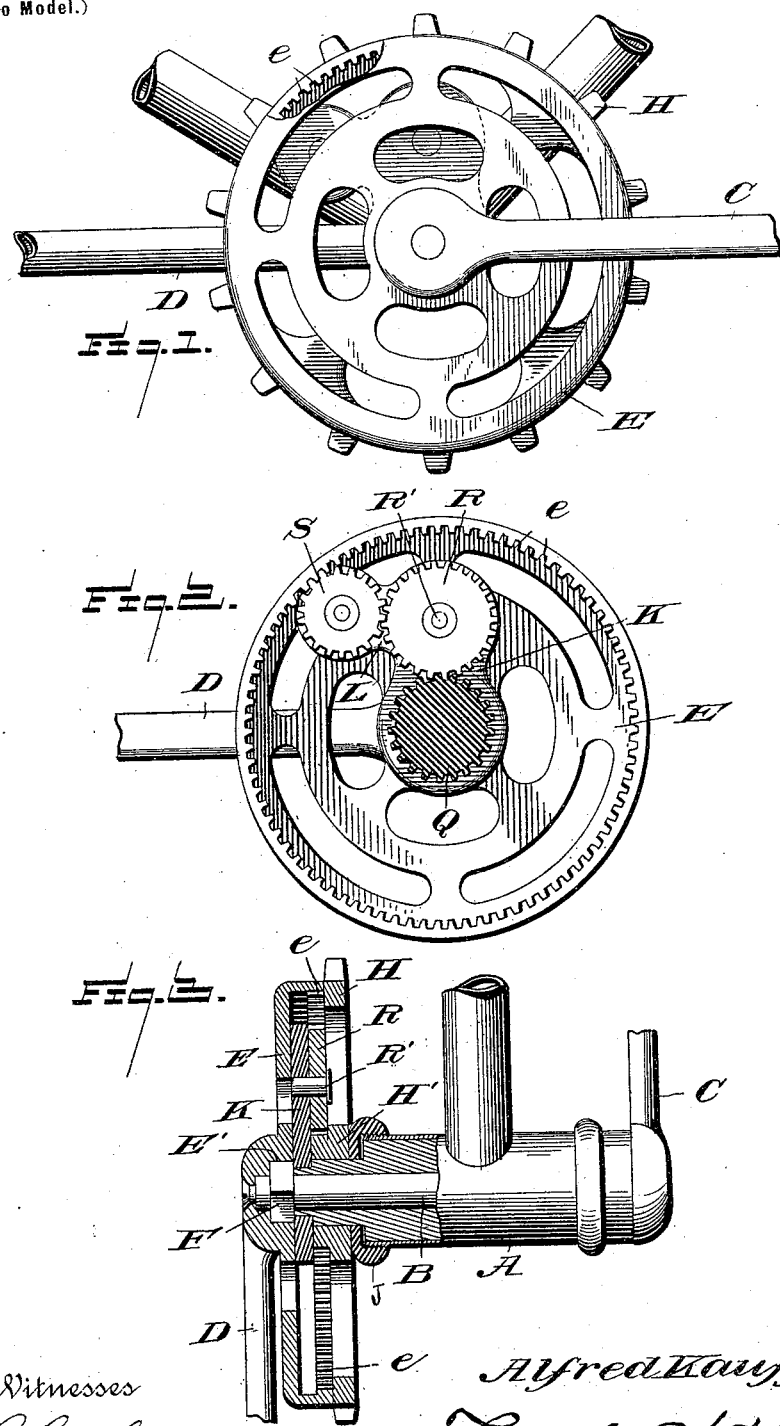

UNITED STATES PATENT OFFICE.

ALFRED KAUFFMAN, OF POTTSTOWN, PENNSYLVANIA.

BICYCLE PROPULSION.

SPECIFICATION forming part of Letters Patent No. 641,516, dated January 16, 1900.

Application filed September 13, 1899. Serial No. 730,382. (No model.)

*To all whom it may concern:*

Be it known that I, ALFRED KAUFFMAN, a citizen of the United States, residing at Pottstown, in the county of Montgomery and State of Pennsylvania, have invented certain new and useful Improvements in Bicycle Propulsion; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to new and useful improvements in bicycle propulsion, and particularly to the provision of an internal train-gear, whereby greater speed may be produced in the propelling of the wheel with as little friction as possible.

More specifically, my invention resides in the provision of an internal-geared wheel which is mounted upon and rotates with the axle-shaft and the provision of a loosely-mounted sprocket-wheel turning on a portion of the crank-hanger, said sprocket-wheel provided with a pinion which meshes with a stationary geared wheel, whereby motion is imparted from the internal-toothed wheel rotating with the shaft to said geared wheels through the medium of a third stationary geared wheel mounted upon a suitable standard or rack, which is held from rotation by means of the stationary crank-hanger.

To these ends and to such others as the invention may pertain the same consists, further, in the novel construction, combination, and arrangement of parts, as will be hereinafter more fully described, and then specifically defined in the appended claim.

My invention is clearly illustrated in the accompanying drawings, which, with the letters of reference marked thereon, form part of this application, and in which—

Figure 1 is a side elevation of my improved mechanism for propelling bicycles. Fig. 2 is an elevation showing the geared mechanism and the manner in which motion is transferred from the internal teeth of the pedal-wheel to the pinion secured to or forming part of the sprocket-wheel, and Fig. 3 is a vertical transverse section through the geared mechanism.

Reference now being had to the details of the drawings by letter, A designates the crank-hanger of the bicycle, in which is journaled the shaft B. Mounted on the outer end of said shaft is a crank D, which has a square recess to receive the nut F, said crank being held in place by means of a screw, as shown clearly in Fig. 3 of the drawings. This crank D has integral therewith the wheel E, which has a flange provided with a series of internal threads e. Mounted on a squared portion of the crank-hanger is the right-angled gear-carrying member K, which has a geared wheel R, mounted on a stub-shaft R', carried by said member, and on the right-angled extension of said member is a second geared wheel S, also mounted on a stub-shaft, and the teeth of these geared wheels S and R are in mesh, the teeth of the wheel S also meshing with the teeth on the inner periphery of the flange of the wheel E. The sprocket-wheel, which is mounted loosely on the hub, is represented in the drawings by the letter H, and said sprocket-wheel has a hub portion H', about which are the teeth forming a pinion Q, (illustrated in Fig. 2 of the drawings,) the teeth of which pinion mesh with the teeth of the wheel R, as clearly shown. Interposed between said sprocket-wheel and the enlarged portion of the crank-hanger is a collar J, as shown.

In operation as the cranks D, secured to the hubs E' of the wheels, E are rotated motion is conveyed from the wheel E through the internal teeth e to the wheels S and R, thence to the pinion Q, which forms a part of the sprocket-wheel, thus causing the sprocket-wheel to make a large number of revolutions at each revolution of the pedal-crank.

Having thus described my invention, what I claim to be new, and desire to secure by Letters Patent, is—

A propulsion device for bicycles consisting of the crank-hanger and shaft journaled therein, the wheel E having a flange with internal teeth, a crank integral with said wheel, the hub portion of the latter having a square recess and central aperture to receive said shaft, a nut F mounted to rotate with the shaft, and seated in said recess, the stationary member K mounted on the crank-hanger, combined with the sprocket-wheel having an integral pinion formed out of a reduced portion of the hub of the latter, and the intermeshing geared wheels for communicating power from said wheel E to the sprocket-wheel, as set forth.

In testimony whereof I affix my signature in presence of two witnesses.

ALFRED KAUFFMAN.

Witnesses:
W. R. SHULER,
DAVID KAUFFMAN.